US012136373B2

(12) United States Patent
Kim et al.

(10) Patent No.: US 12,136,373 B2
(45) Date of Patent: Nov. 5, 2024

(54) PIXEL CIRCUIT AND DISPLAY DEVICE HAVING THE SAME

(71) Applicant: Samsung Display Co., LTD., Yongin-si (KR)

(72) Inventors: Sunho Kim, Seongnam-si (KR); Yoomin Ko, Suwon-si (KR); Juchan Park, Seoul (KR); Pilsuk Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/119,502

(22) Filed: Mar. 9, 2023

(65) Prior Publication Data

US 2023/0351935 A1 Nov. 2, 2023

(30) Foreign Application Priority Data

Apr. 28, 2022 (KR) ........................ 10-2022-0053018

(51) Int. Cl.
*G09G 3/20* (2006.01)

(52) U.S. Cl.
CPC ............. *G09G 3/20* (2013.01); *G09G 3/2096* (2013.01); *G09G 2300/0819* (2013.01);
(Continued)

(58) Field of Classification Search
CPC ............. G09G 3/20; G09G 2310/0267; G09G 2310/0275; G09G 2310/08; G09G 2330/021; G09G 2230/00; G09G 2300/08–0895; G09G 3/32–3291; G09G 2310/0286; G09G 2320/04–048; G09G 3/30–3208; G09G 3/3266; G09G 2310/0248; G09G 2310/0251;
(Continued)

(56) References Cited

U.S. PATENT DOCUMENTS

2017/0287395 A1* 10/2017 Jang ..................... H03K 17/687
2019/0266941 A1* 8/2019 Pyo ...................... G09G 3/3225
(Continued)

FOREIGN PATENT DOCUMENTS

KR 10-1108172 1/2012
KR 10-2017-0112036 10/2017

*Primary Examiner* — Amr A Awad
*Assistant Examiner* — Aaron Midkiff
(74) *Attorney, Agent, or Firm* — KILE PARK REED & HOUTTEMAN PLLC

(57) ABSTRACT

A pixel circuit includes a first transistor, a second transistor including a control electrode receiving a write gate signal generated based on clock signals having a duration of M horizontal time, M being a positive integer greater than or equal to 2, a first electrode receiving a data voltage, and a second electrode electrically connected to the first transistor, a third transistor including a control electrode receiving a compensation gate signal generated based on a first next write gate signal applied after the write gate signal is applied, a first and second electrodes electrically connected to the first transistor, and a fourth transistor including a control electrode receiving an initialization gate signal generated based on a previous write gate signal applied before the write gate signal is applied, a first electrode receiving a first initialization voltage, and a second electrode electrically connected to the first transistor.

16 Claims, 13 Drawing Sheets

(52) U.S. Cl.
CPC ............... *G09G 2300/0852* (2013.01); *G09G 2300/0861* (2013.01); *G09G 2310/0267* (2013.01); *G09G 2310/0275* (2013.01); *G09G 2310/08* (2013.01); *G09G 2320/045* (2013.01); *G09G 2330/021* (2013.01)

(58) Field of Classification Search
CPC ............... G09G 3/3225; G09G 3/3233; G09G 2310/0264; G09G 2330/028; G11C 19/28–287
See application file for complete search history.

(56) References Cited

U.S. PATENT DOCUMENTS

| | | | | |
|---|---|---|---|---|
| 2019/0287458 A1* | 9/2019 | Park | ..................... | G09G 3/3233 |
| 2021/0027696 A1* | 1/2021 | Kim | ......................... | G09G 3/32 |
| 2023/0107029 A1* | 4/2023 | Wang | ..................... | G11C 19/28<br>345/206 |

* cited by examiner

PIXEL CIRCUIT AND DISPLAY DEVICE HAVING THE SAME

CROSS REFERENCE TO RELATED APPLICATION(S)

This application claims priority to and benefits of Korean Patent Application No. 10-2022-0053018 under 35 U.S.C. § 119, filed on Apr. 28, 2022, in the Korean Intellectual Property Office (KIPO), the contents of which are herein incorporated by reference in their entireties.

BACKGROUND

1. Technical Field

The disclosure relates to a pixel circuit and a display device having a pixel circuit generating a plurality of gate signals from one gate signal.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

Various types of gate signals may be applied to each of the pixels. For this, drivers for generating respective gate signals may be separately disposed. As the number of drivers for generating respective gate signals increases, power consumption for driving the display device may increase, and an extra space may be necessary for spaces occupied by the drivers.

SUMMARY

Embodiments of the disclosure provide a display device that is applied multiple gate signals generated from one gate signal.

Embodiments of the disclosure also provide a display device that increases a threshold voltage compensation time of a driving transistor.

According to embodiments of the disclosure, a pixel circuit may include a first transistor including a control electrode electrically connected to a first node, a first electrode electrically connected to a second node, and a second electrode electrically connected to a third node, a second transistor including a control electrode that receives a write gate signal generated based on clock signals having a duration of M horizontal time, M being a positive integer greater than or equal to 2, a first electrode that receives a data voltage, and a second electrode electrically connected to the second node, a third transistor including a control electrode that receives a compensation gate signal generated based on a first next write gate signal applied after the write gate signal is applied, a first electrode electrically connected to the third node, and a second electrode electrically connected to the first node, a first capacitor including a first electrode that receives a first power voltage and a second electrode electrically connected to the first node, a fourth transistor including a control electrode that receives an initialization gate signal generated based on a previous write gate signal applied before the write gate signal is applied, a first electrode that receives a first initialization voltage, and a second electrode electrically connected to the first node, a fifth transistor including a control electrode that receives an emission signal, a first electrode that receives the first power voltage, and a second electrode electrically connected to the second node, a sixth transistor including a control electrode that receives the emission signal, a first electrode electrically connected to the third node, and a second electrode electrically connected to a fourth node, and a light emitting element including a first electrode electrically connected to the fourth node and a second electrode that receives a second power voltage.

In an embodiment, the second transistor may be a p-type transistor, and the third transistor and the fourth transistor may be n-type transistors.

In an embodiment, the initialization gate signal may be generated by inverting the previous write gate signal, and the compensation gate signal may be generated by inverting the first next write gate signal.

In an embodiment, the pixel circuit may further include a second capacitor including a first electrode that receives the write gate signal and a second electrode electrically connected to the first node, and a seventh transistor including a control electrode that receives a second next write gate signal applied after the first next write gate signal is applied, a first electrode that receives a second initialization voltage, and a second electrode electrically connected to the fourth node.

In an embodiment, the seventh transistor may be a p-type transistor.

In an embodiment, the emission signal may decrease stepwise in case that the emission signal decreases from a high voltage level to a low voltage level.

According to embodiments of the disclosure, a display device may include a display panel including a pixel circuit, a gate driver that generates a write gate signal based on clock signals having a duration of M horizontal time, M being a positive integer greater than or equal to 2, an initialization gate signal based on a previous write gate signal applied before the write gate signal is applied, and a compensation gate signal based on a first next write gate signal applied after the write gate signal is applied, a data driver that applies a data voltage to the pixel circuit, an emission driver that applies an emission signal to the pixel circuit, and a timing controller that controls the gate driver, the data driver, and the emission driver. The pixel circuit may include a first transistor including a control electrode electrically connected to a first node, a first electrode electrically connected to a second node, and a second electrode electrically connected to a third node, a second transistor including a control electrode that receives the write gate signal, a first electrode that receives the data voltage, and a second electrode electrically connected to the second node, a third transistor including a control electrode that receives the compensation gate signal, a first electrode electrically connected to the third node, and a second electrode electrically connected to the first node, a first capacitor including a first electrode that receives a first power voltage and a second electrode electrically connected to the first node, a fourth transistor including a control electrode that receives the initialization gate signal, a first electrode that receives a first initialization voltage, and a second electrode electrically connected to the first node, a fifth transistor including a control electrode that receives the emission signal, a first electrode that receives the first power voltage, and a second electrode electrically connected to the second node, a sixth transistor including a control electrode that receives the emission signal, a first electrode electrically connected to the third node, and a second electrode electrically connected to a fourth node, and a light emitting element including a first electrode electrically connected to the fourth node and a second electrode that receives a second power voltage.

In an embodiment, the second transistor may be a p-type transistor, and the third transistor and the fourth transistor may be n-type transistors.

In an embodiment, the initialization gate signal may be generated by inverting the previous write gate signal, and the compensation gate signal may be generated by inverting the first next write gate signal.

In an embodiment, the pixel circuit may further include a second capacitor including a first electrode that receives the write gate signal and a second electrode electrically connected to the first node, and a seventh transistor including a control electrode that receives a second next write gate signal applied after the first next write gate signal is applied, a first electrode that receives a second initialization voltage, and a second electrode electrically connected to the fourth node.

In an embodiment, the seventh transistor may be a p-type transistor.

In an embodiment, the emission signal may decrease stepwise in case that the emission signal decreases from a high voltage level to a low voltage level.

In an embodiment, the gate driver may include a first stage and a second stage, the write gate signal may include a first write gate signal and a second write gate signal, the clock signals may include a first clock signal, a second clock signal, a third clock signal, and a fourth clock signal, the first stage may generate the first write gate signal based on the first clock signal having a duration of 2 horizontal time and the second clock signal having a duration of 2 horizontal time, and the second stage may generate the second write gate signal based on the third clock signal having a duration of 2 horizontal time and the fourth clock signal having a duration of 2 horizontal time.

In an embodiment, a phase difference between the first clock signal and the third clock signal may be 1 horizontal time, and a phase difference between the second clock signal and the fourth clock signal may be 1 horizontal time.

In an embodiment, the first stage may generate the first write gate signal in response to a first scan start signal, the second stage may generate the second write gate signal in response to a second scan start signal, and a phase difference between the first scan start signal and the second scan start signal may be 1 horizontal time.

In an embodiment, the first stage may include an eighth transistor including a control electrode that receives the first clock signal, a first electrode that receives a first input signal, and a second electrode electrically connected to a fifth node, a third capacitor including a first electrode electrically connected to the fifth node and a second electrode electrically connected to a first output terminal of the first stage, a ninth transistor including a control electrode electrically connected to a sixth node, a first electrode that receives a high voltage, and a second electrode, a tenth transistor including a control electrode that receives the second clock signal, a first electrode electrically connected to the second electrode of the ninth transistor, and a second electrode electrically connected to the fifth node, a fourth capacitor including a first electrode that receives the high voltage and a second electrode electrically connected to the sixth node, an eleventh transistor including a control electrode electrically connected to the fifth node, a first electrode that receives the first clock signal, and a second electrode electrically connected to the sixth node, a twelfth transistor including a control electrode that receives the first clock signal, a first electrode that receives a low voltage, and a second electrode electrically connected to the sixth node, a thirteenth transistor including a control electrode electrically connected to the sixth node, a first electrode that receives the high voltage, and a second electrode electrically connected to the first output terminal, and a fourteenth transistor including a control electrode electrically connected to the fifth node, a first electrode that receives the second clock signal, and a second electrode electrically connected to the first output terminal.

In an embodiment, the second stage may include a fifteenth transistor including a control electrode that receives the third clock signal, a first electrode that receives a second input signal, and a second electrode electrically connected to a seventh node, a fifth capacitor including a first electrode electrically connected to the seventh node and a second electrode electrically connected to a second output terminal of the second stage, a sixteenth transistor including a control electrode electrically connected to an eighth node, a first electrode that receives the high voltage, and a second electrode, a seventeenth transistor including a control electrode that receives the fourth clock signal, a first electrode electrically connected to the second electrode of the sixteenth transistor, and a second electrode electrically connected to the seventh node, a sixth capacitor including a first electrode that receives the high voltage and a second electrode electrically connected to the eighth node, an eighteenth transistor including a control electrode electrically connected to the seventh node, a first electrode that receives the third clock signal, and a second electrode electrically connected to the eighth node, a nineteenth transistor including a control electrode that receives the third clock signal, a first electrode that receives the low voltage, and a second electrode electrically connected to the eighth node, a twentieth transistor including a control electrode electrically connected to the eighth node, a first electrode that receives the high voltage, and a second electrode electrically connected to the second output terminal, and a twenty-first transistor including a control electrode electrically connected to the seventh node, a first electrode that receives the fourth clock signal, and a second electrode electrically connected to the second output terminal.

In an embodiment, the gate driver may include a first stage, a second stage, and a third stage, the write gate signal may include a first write gate signal, a second write gate signal, and a third write gate signal, the clock signals may include a first clock signal, a second clock signal, a third clock signal, a fourth clock signal, a fifth clock signal, and a sixth clock signal. The first stage may generate the first write gate signal in response to the first clock signal having a duration of 3 horizontal time and the second clock signal having a duration of 3 horizontal time, the second stage may generate the second write gate signal in response to the third clock signal having a duration of 3 horizontal time and the fourth clock signal having a duration of 3 horizontal time, and the third stage may generate the third write gate signal in response to the fifth clock signal having a duration of 3 horizontal time and the sixth clock signal having a duration of 3 horizontal time.

In an embodiment, a phase difference between the first clock signal and the third clock signal may be 1 horizontal time, a phase difference between the third clock signal and the fifth clock signal may be 1 horizontal time, a phase difference between the second clock signal and the fourth clock signal may be 1 horizontal time, and a phase difference between the fourth clock signal and the sixth clock signal may be 1 horizontal time.

In an embodiment, the first stage may generate the first write gate signal in response to a first scan start signal, the second stage may generate the second write gate signal in response to a second scan start signal, the third stage may generate the third write gate signal in response to a third scan start signal, a phase difference between the first scan start signal and the second scan start signal may be 1 horizontal time, and a phase difference between the second scan start signal and the third scan start signal may be 1 horizontal time.

Therefore, the display device may generate multiple gate signals from one gate signal by generating an initialization gate signal based on a previous write gate signal applied before the write gate signal is applied, and generating a compensation gate signal based on a first next write gate signal applied after the write gate signal is applied. Accordingly, drivers for generating respective gate signals may not be required to be separately disposed.

The display device may also reduce power consumption and save a space for additional drivers for generating respective gate signals.

Further, the display device may increase a threshold voltage compensation time of a driving transistor by generating a write gate signal based on clock signals having a duration of M horizontal time, where M is a positive integer greater than or equal to 2.

However, the effects of the disclosure are not limited to the above-described effects, and may be variously expanded without departing from the spirit and scope of the disclosure.

DETAILED DESCRIPTION OF THE EMBODIMENTS

Hereinafter, the disclosure will be explained in detail with reference to the accompanying drawings.

When an element, such as a layer, is referred to as being "on", "connected to", or "coupled to" another element or layer, it may be directly on, connected to, or coupled to the other element or layer or intervening elements or layers may be present. When, however, an element or layer is referred to as being "directly on", "directly connected to", or "directly coupled to" another element or layer, there are no intervening elements or layers present. To this end, the term "connected" may refer to physical, electrical, and/or fluid connection, with or without intervening elements.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 1:
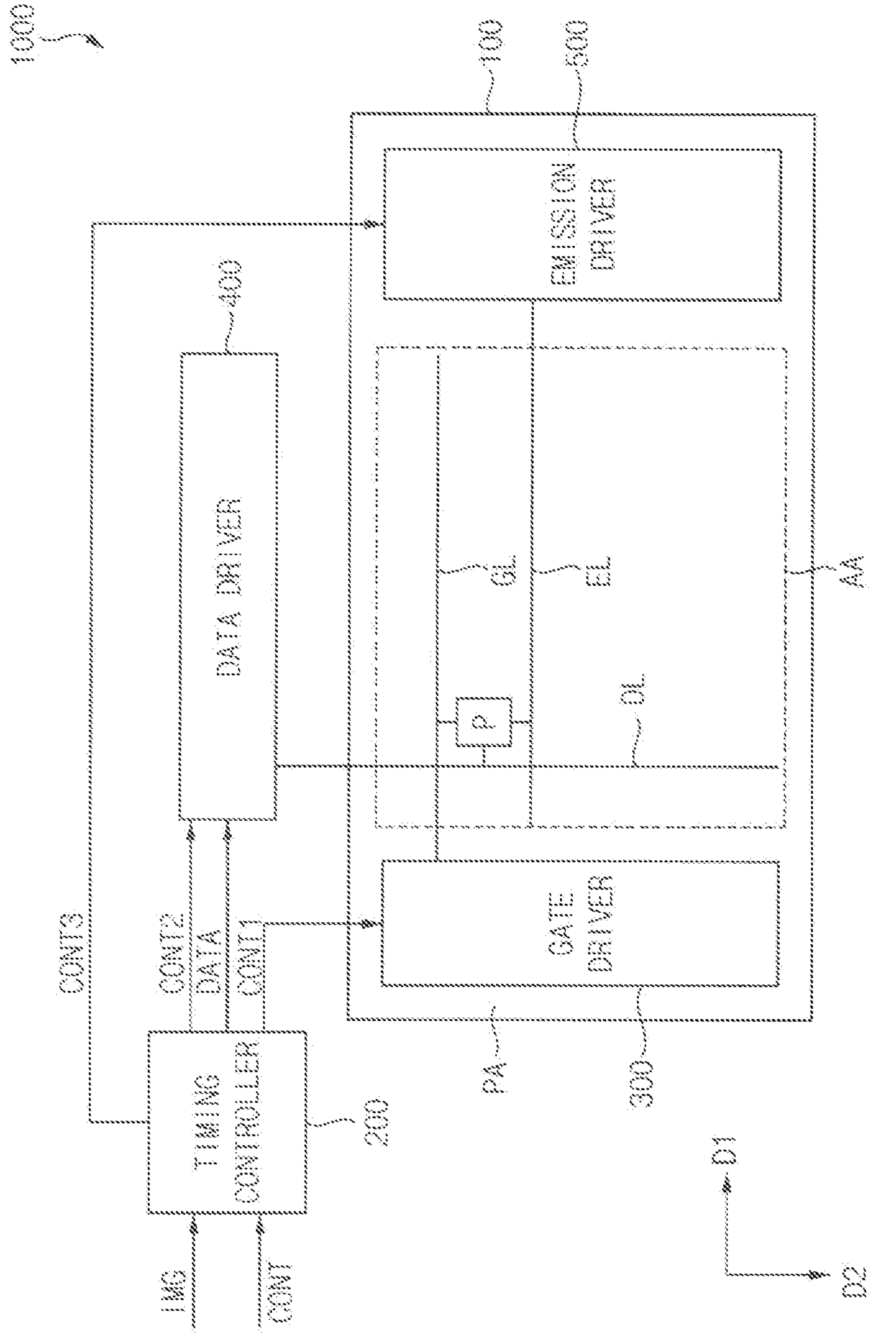
FIG. 1 is a schematic block diagram illustrating a display device according to embodiments of the disclosure.

FIG. 1 is a schematic block diagram illustrating a display device 1000 according to embodiments of the disclosure.

Referring to FIG. 1, the display device 1000 may include a display panel 100, a timing controller 200, a gate driver 300, a data driver 400, and a emission driver 500. In an embodiment, the timing controller 200 and the data driver 400 may be integrated into one chip.

The display panel 100 may have a display region AA on which an image is displayed and a peripheral region PA adjacent to the display region AA. In an embodiment, the gate driver 300 and the emission driver 500 may be disposed in the peripheral region PA of the display panel 100.

The display panel 100 may include multiple gate lines GL, multiple data lines DL, multiple emission lines EL, and multiple pixel circuits P electrically connected to the data lines DL, the gate lines GL, and the emission lines EL. The gate lines GL and the emission lines EL may extend in a first direction D1, and the data lines DL may extend in a second direction D2 intersecting the first direction D1.

The timing controller 200 may receive input image data IMG and an input control signal CONT from a host processor (e.g., a graphic processing unit; GPU). For example, the input image data IMG may include red image data, green image data, and blue image data. In an embodiment, the input image data IMG may further include white image data. In another embodiment, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may generate the third control signal CONT3 for controlling operation of the emission driver 500 based on the input control signal CONT and output the third control signal CONT3 to the emission driver 500. The third control signal CONT3 may include a vertical start signal and a emission clock signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

The emission driver 500 may generate emission signals for driving the emission lines EL in response to the third control signal CONT3 input from the timing controller 200. The emission driver 500 may output the emission signals to the emission lines EL. For example, the emission driver 500 may sequentially output the emission signals to the emission lines EL.

Figure 2:
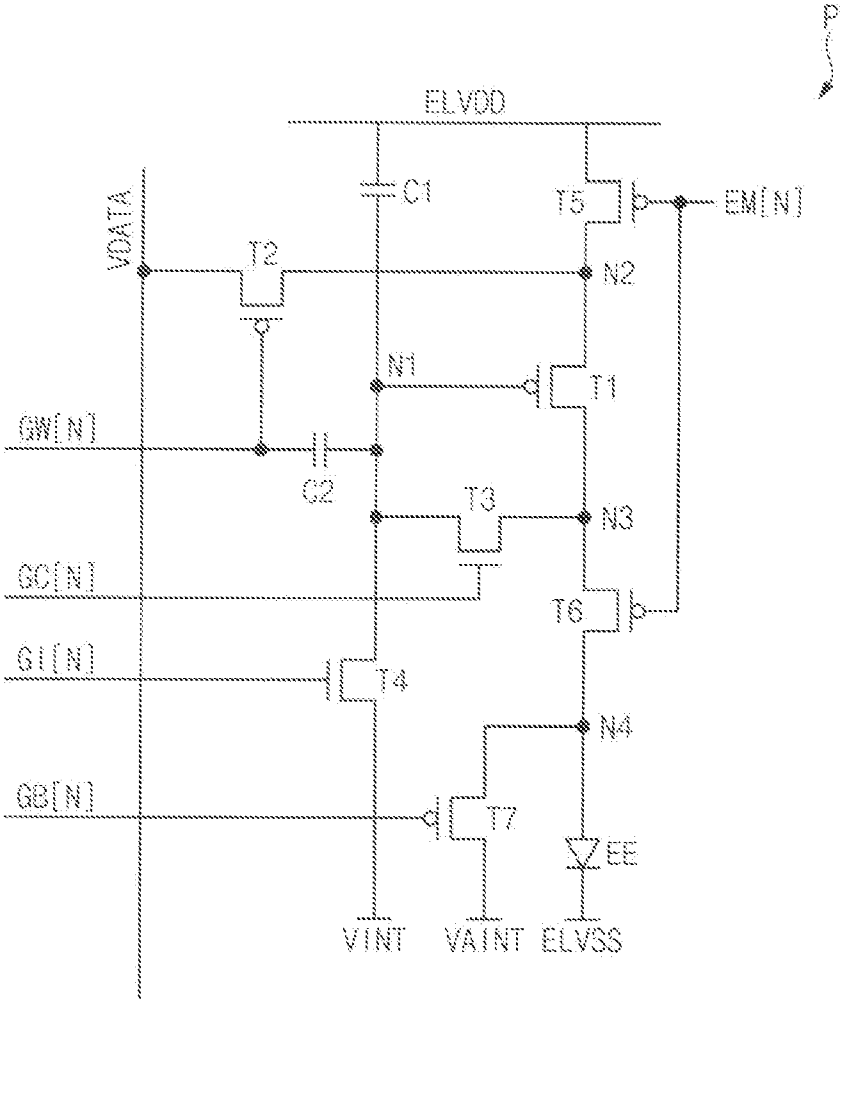
FIG. 2 is a schematic diagram of an equivalent circuit of a pixel of the display device of FIG. 1.
Figure 3:
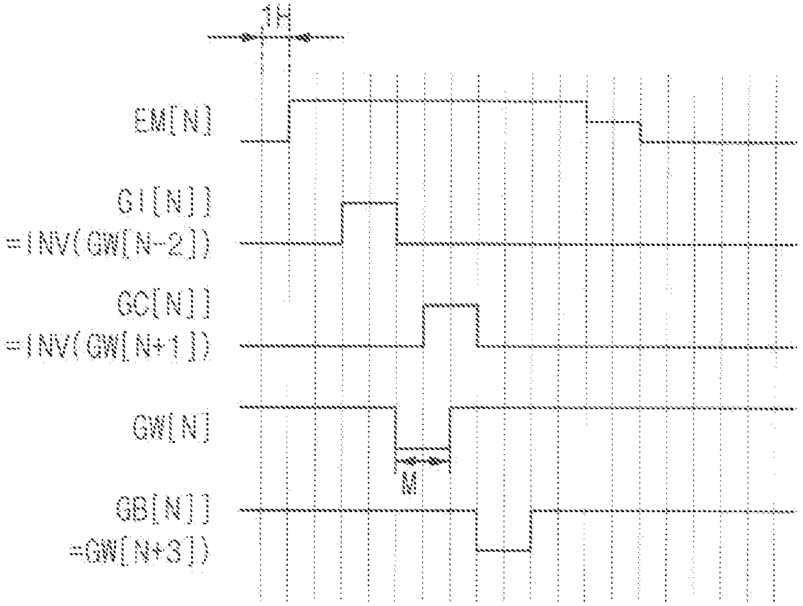
FIG. 3 is a schematic timing diagram illustrating an example of gate signals and emission signals of the display device of FIG. 1.

FIG. 2 is a schematic diagram of an equivalent circuit of the pixel P of the display device 1000 of FIG. 1, and FIG. 3 is a schematic timing diagram illustrating an example of gate signals and emission signals EM[N] of the display device 1000 of FIG. 1.

Referring to FIGS. 1 to 3, the pixel circuit P may include a first transistor T1 (i.e., a driving transistor) including a control electrode connected to a first node N1, a first electrode connected to a second node N2, and a second electrode connected to a third node N3, a second transistor T2 including a control electrode receiving a write gate signal GW[N] generated based on clock signals having a duration of M horizontal time, where M is a positive integer greater than or equal to 2, a first electrode receiving the data voltage VDATA, and a second electrode connected to the second node N2, a third transistor T3 including a control electrode receiving a compensation gate signal GC[N] generated based on a first next write gate signal GW[N+1] applied after the write gate signal GW[N] is applied, a first electrode connected to the third node N3, and a second electrode connected to the first node N1, a first capacitor C1 including a first electrode receiving a first power voltage ELVDD (e.g., a high power voltage) and a second electrode connected to the first node N1, a fourth transistor T4 including a control electrode receiving an initialization gate signal GI[N] generated based on a previous write gate signal GW[N−2] applied before the write gate signal GW[N] is applied, a first electrode receiving a first initialization voltage VINT, and a second electrode connected to the first node N1, a fifth transistor T5 including a control electrode receiving the emission signal EM[N], a first electrode receiving the first power voltage ELVDD, and a second electrode connected to the second node N2, a sixth transistor T6 including a control electrode receiving the emission signal EM[N], a first electrode connected to the third node N3, and a second electrode connected to a fourth node N4, and a light emitting element EE including a first electrode connected to the fourth node N4 and a second electrode receiving a second power voltage ELVSS (e.g., a low power voltage). The pixel circuit P may further include a second capacitor C2 including a first electrode receiving the write gate signal GW[N] and a second electrode connected to the first node N1, and a seventh transistor T7 including a control electrode receiving a second next write gate signal GW[N+3] (i.e., a bias gate signal GB[N]) applied after the first next write gate signal GW[N+1] is applied, a first electrode receiving a second initialization voltage VAINT, and a second electrode connected to the fourth node N4. N may be a positive integer greater than or equal to 3.

Gate signals for driving one pixel row may be sequentially applied to the display panel 100 of the display device 1000 for 1 horizontal time 1H in one frame. For example, the gate driver 300 may sequentially output gate signals (i.e., the write gate signal GW[N], the compensation gate signal GC[N], the initialization gate signal GI[N], and the bias gate signal GB [N]) to the gate lines GL for 1 horizontal time 1H.

The first next write gate signal GW[N+1] may be a write gate signal applied to a pixel row (i.e., the pixel circuits P included in the pixel row) to which gate signals are applied later than a pixel row to which a current write gate signal (i.e., GW[N]) is applied. For example, in case that the gate driver 300 applies gate signals unidirectionally from top to bottom and applies the write gate signal GW[N] to the third pixel row (i.e., in case N is 3), the first next write gate signal GW[N+1] may be a write gate signal applied to a fourth pixel row. Here, as shown in FIG. 3, the first next write gate signal is represented as GW[N+1], but the disclosure is not limited thereto. For example, the first next write gate signal may be GW[N+2], GW[N+3], GW[N+4], etc.

The previous write gate signal GW[N−2] may be a write gate signal applied to a pixel row to which gate signals are applied earlier than a pixel row to which the current write gate signal (i.e., GW[N]) is applied. For example, in case that the gate driver 300 applies gate signals unidirectionally from top to bottom and applies the write gate signal GW[N] to the third pixel row (i.e., in case N is 3), the previous write gate signal GW[N−2] may be a write gate signal applied to a first pixel row. Here, as shown in FIG. 3, the previous write gate signal is represented as GW[N−2], but the disclosure is not limited thereto. For example, the previous write gate signal may be GW[N−1], GW[N−2], GW[N−3], etc.

The second next write gate signal GW[N+3] may be a write gate signal applied to a pixel row to which gate signals are applied later than a pixel row to which the first next write gate signal GW[N+1] is applied. For example, in case that the gate driver 300 applies gate signals unidirectionally from top to bottom and applies the first next write gate signal GW[N+1] to the fourth pixel row (i.e., in case N is 3), the second next write gate signal GW[N+3] may be a write gate signal applied to a sixth pixel row. Here, as shown in FIG. 3, the second next write gate signal is represented as GW[N+3], but the disclosure is not limited thereto. For example, the second next write gate signal may be GW[N+2], GW[N+4], GW[N+5], etc.

In an embodiment, the second transistor T2 may be a p-type transistor, and the third transistor T3 and the fourth transistor T4 may be n-type transistors. In an embodiment, the seventh transistor T7 may be the p-type transistor. In an embodiment, the initialization gate signal GI[N] may be generated by inverting the previous write gate signal GW[N−2], and the compensation gate signal GC[N] may be generated by inverting the first next write gate signal GW[N+1].

For example, the initialization gate signal GI[N] having a high voltage level may be generated by inverting the previous write gate signal GW[N−2] having a low voltage level. For example, the compensation gate signal GC[N] having a high voltage level may be generated by inverting the first next write gate signal GW[N+1] having a low voltage level.

The emission signal EM[N] may decrease stepwise in case that the emission signal EM[N] decreases from the high voltage level to the low voltage level. For example, as shown in FIG. 3, the emission signal EM[N] may decrease stepwise from the high voltage level to the low voltage level for 2 horizontal time.

Figure 4:
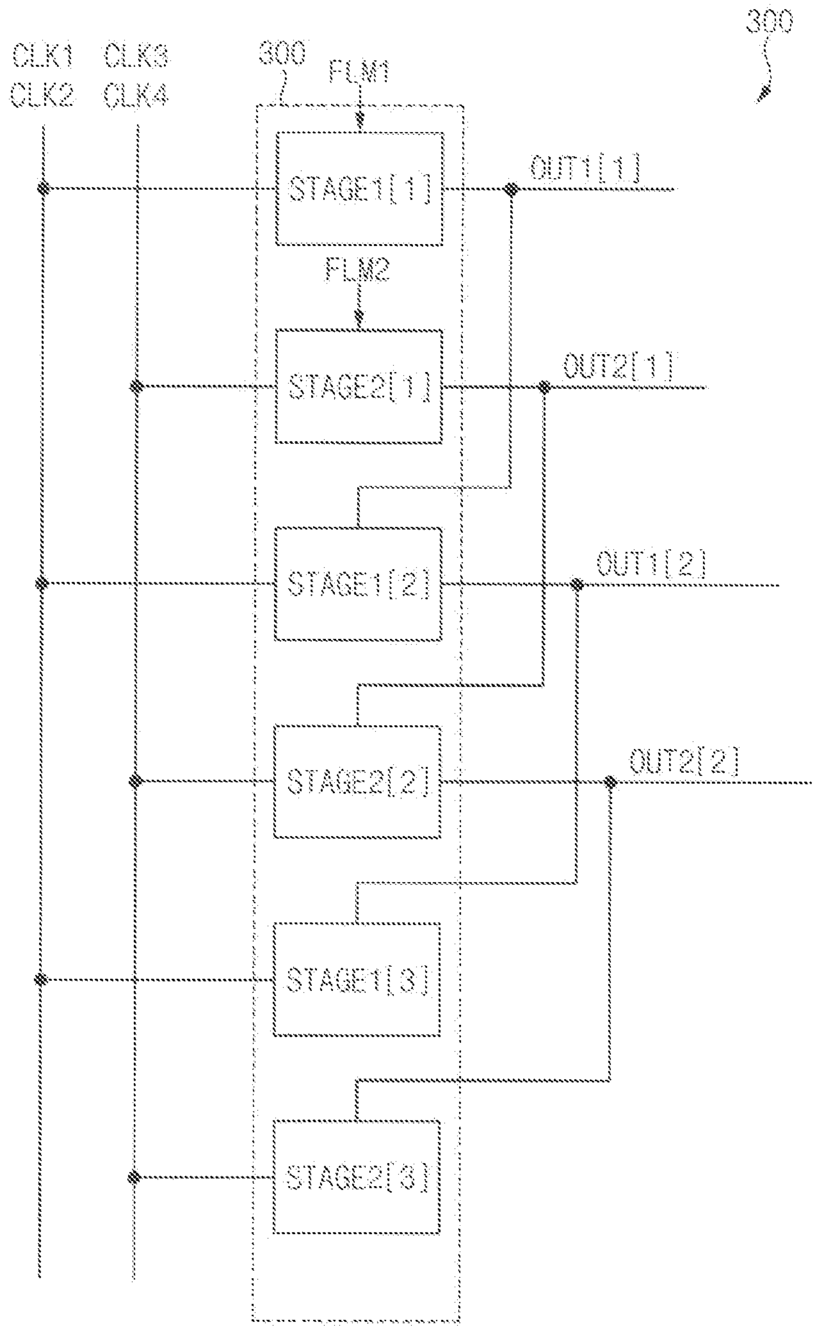
FIG. 4 is a schematic block diagram illustrating an example of stages of the display device of FIG. 1.
Figure 5:
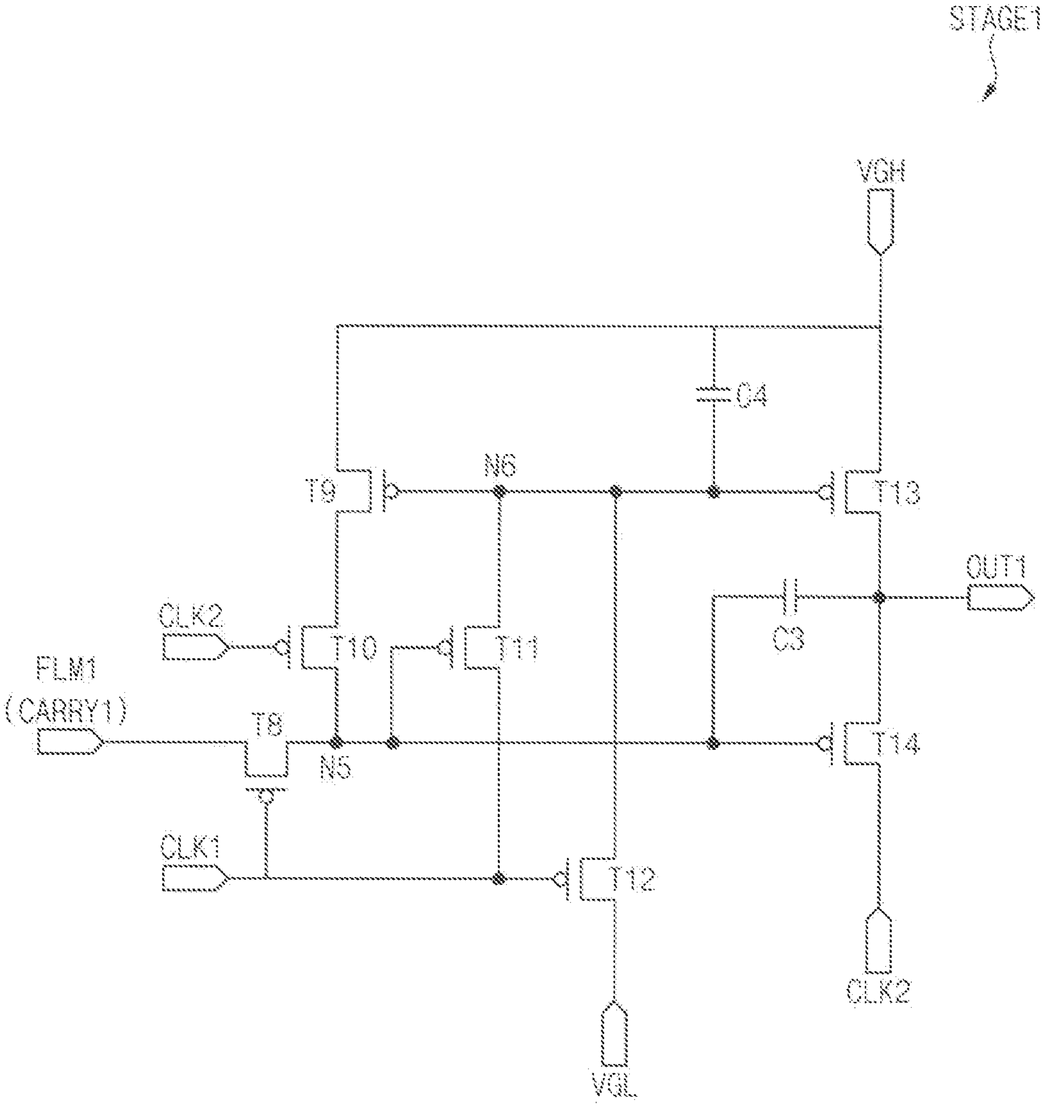
FIG. 5 is a schematic diagram of an equivalent circuit of a pixel of a first stage of the display device of FIG. 1.
Figure 6:
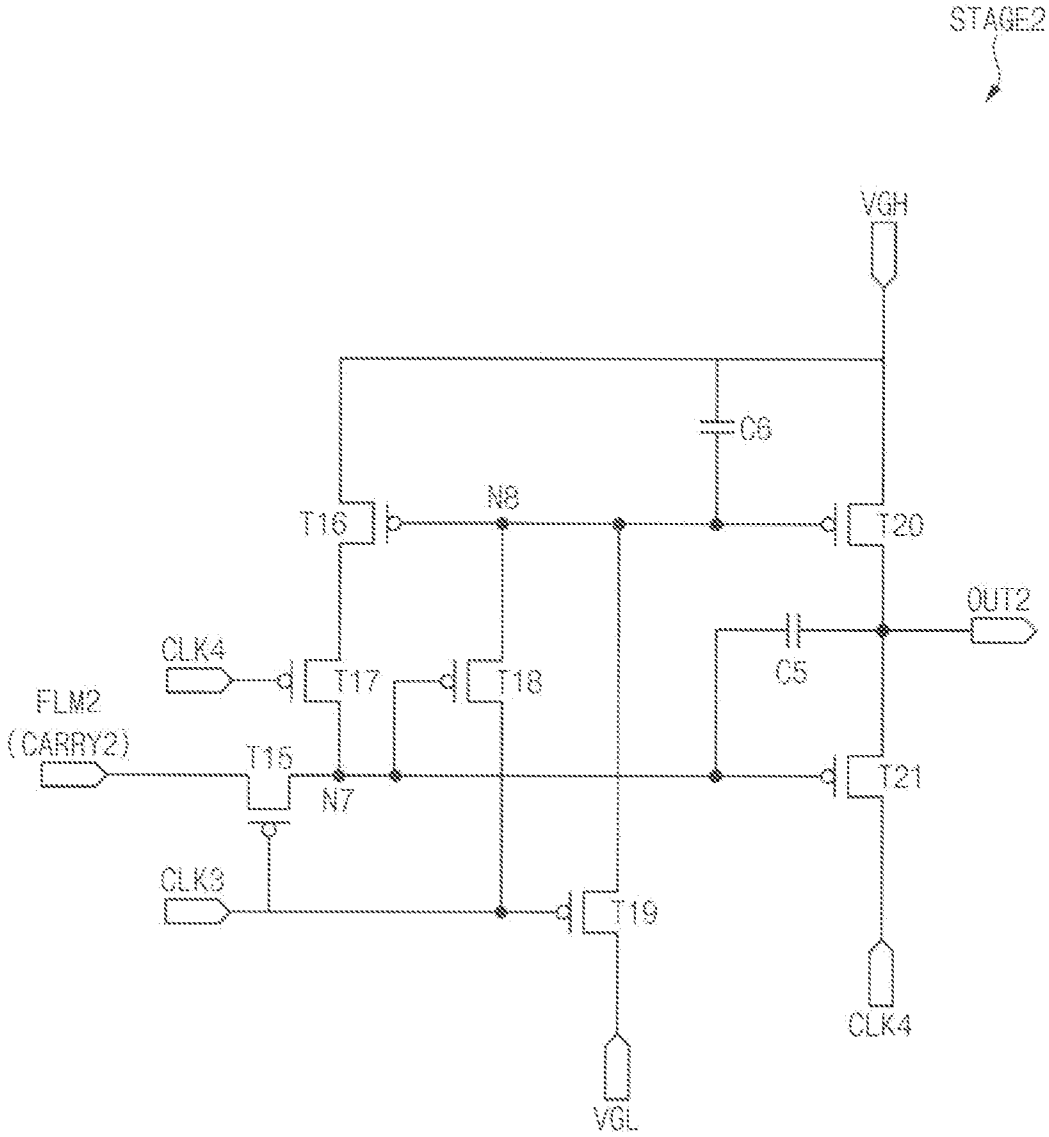
FIG. 6 is a schematic diagram of an equivalent circuit of a pixel of a second stage of the display device of FIG. 1.
Figure 7:
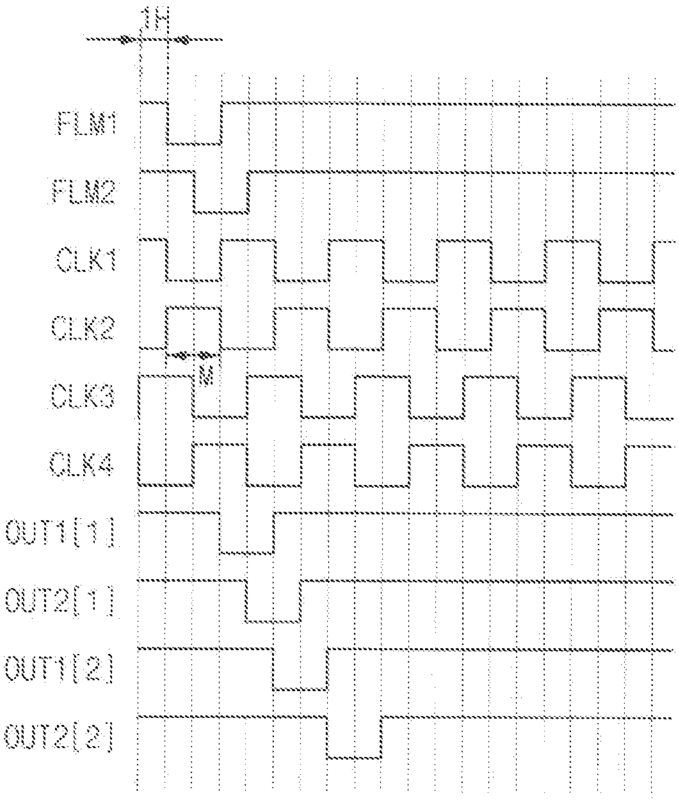
FIG. 7 is a schematic timing diagram illustrating an example of input/output signals of stages of the display device of FIG. 1.
Figure 8:
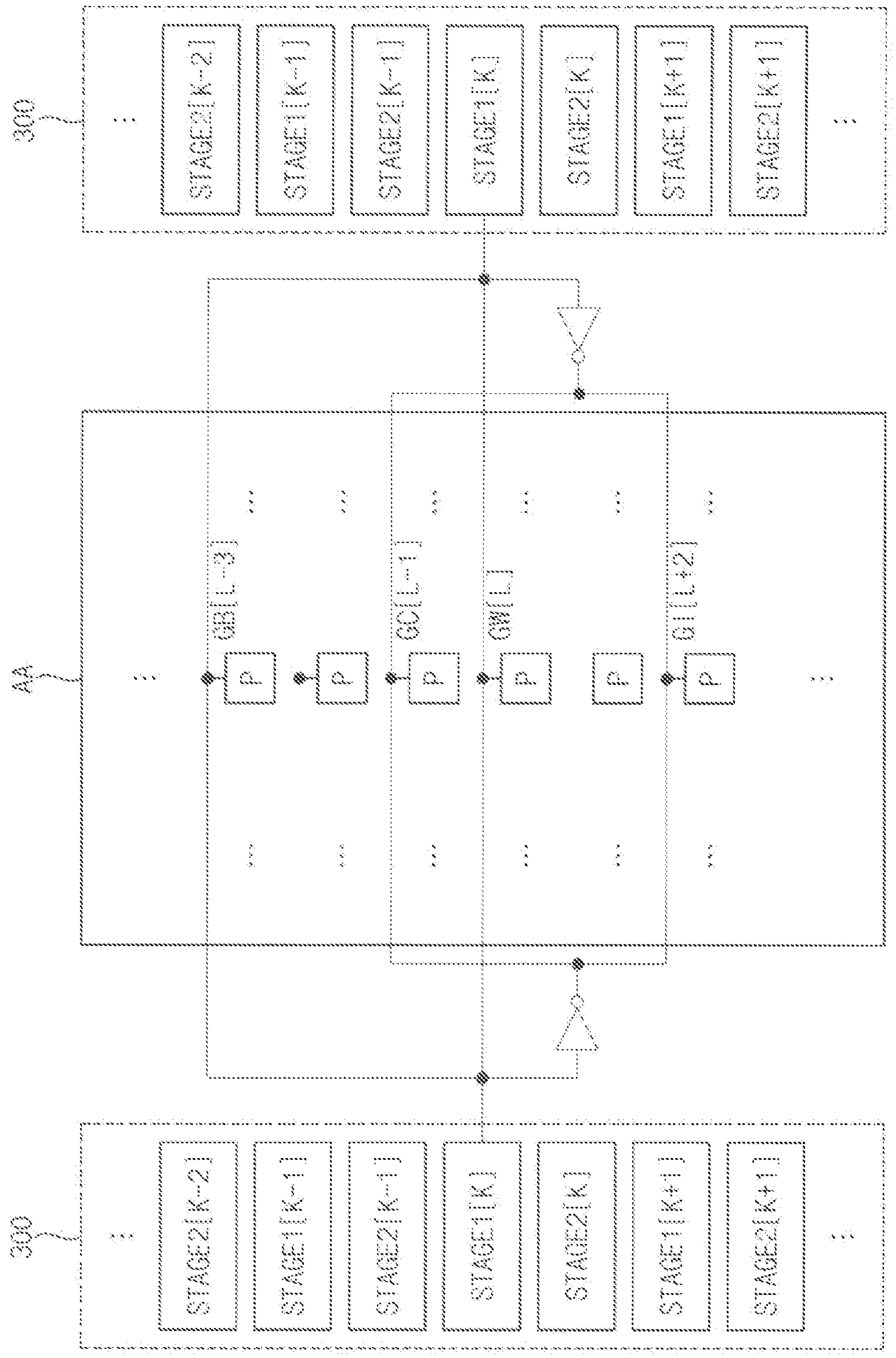
FIGS. 8 and 9 are schematic timing diagrams illustrating an example in which the display device of FIG. 1 applies gate signals to a pixel circuit.
Figure 9:
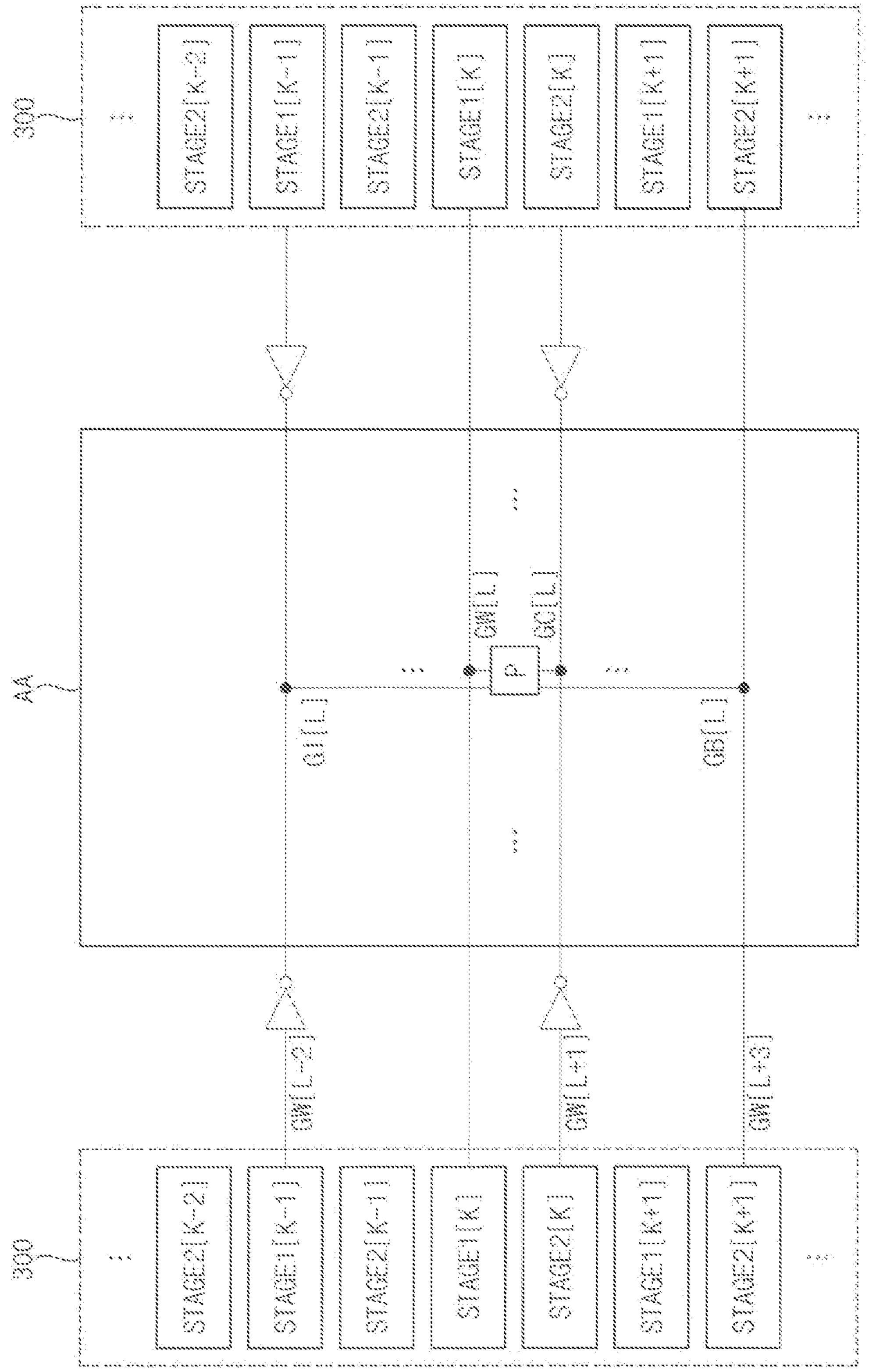

FIG. 4 is a schematic block diagram illustrating an example of stages of the display device 1000 of FIG. 1, FIG. 5 is a schematic diagram of equivalent circuit of a pixel of a first stage STAGE1 of the display device 1000 of FIG. 1, FIG. 6 is a schematic diagram of equivalent circuit of a pixel of a second stage STAGE2 of the display device 1000 of FIG. 1, FIG. 7 is a schematic timing diagram illustrating an example of input/output signals of the stages of the display device 1000 of FIG. 1 and FIGS. 8 and 9 are schematic timing diagrams illustrating an example in which the display device 1000 of FIG. 1 applies gate signals to the pixel circuit P. FIGS. 4 to 9 illustrate a case where M is 2.

Referring to FIGS. 1 to 9, the write gate signal GW[N] may be generated based on clock signals having a duration of M horizontal time. Accordingly, the write gate signal GW[N] may be in a low voltage level for M horizontal time. The duration may be a time during which the clock signals maintain the high voltage level (or the low voltage level).

Accordingly, the compensation gate signal GC[N] may also be the high voltage level for M horizontal time. As a result, a threshold voltage compensation time of the driving transistor (i.e., the first transistor T1 of FIG. 2) may be increased by using the compensation gate signal GC[N] in which the high voltage level is maintained for two or more horizontal time. Here, the threshold voltage compensation time may be a time in which a voltage of the first node N1 is compensated by the threshold voltage of the first transistor T1 by turning on the third transistor T3 of FIG. 2. A case where M is 2 will be described in detail below with reference to FIGS. 4 to 9.

The gate driver 300 may include a first stage STAGE1 and a second stage STAGE2. The first stage STAGE1 may generate a write gate signal GW[N] based on a first clock signal CLK1 having a duration of 2 horizontal time and a second clock signal CLK2 having a duration of 2 horizontal time, and the second stage STAGE2 may generate a write gate signal GW[N] based on a third clock signal CLK3 having a duration of 2 horizontal time and a fourth clock signal CLK4 having a duration of 2 horizontal time.

The first stage STAGE1 may generate a write gate signal GW[N] in response to the first scan start signal FLM1. For example, a first one STAGE1[1] of the first stages STAGE1 may use the first scan start signal FLM1 as a first input signal. A K-th, where K is a positive integer greater than or equal to 2, one STAGE1[K] of the first stages STAGE1 may use a signal output from a first output terminal of a K−1-th one STAGE1[K−1] of the first stages STAGE1 as a first input signal. The signal output from the first output terminal of the K−1-th one STAGE1[K−1] of the first stages STAGE1 may be the first carry signal CARRY1 of the K-th one STAGE1[K] of the first stages STAGE1. For example, a second one STAGE1[2] of the first stages STAGE1 may use a signal output from the first output terminal OUT1[1] of the first one STAGE1[1] of the first stages STAGE1 as a first input signal.

The second stage STAGE2 may generate a write gate signal GW[N] in response to the second scan start signal FLM2. For example, a first one STAGE2[1] of the second stages STAGE2 may use the second scan start signal FLM2 as a second input signal. A K-th one STAGE2[K] of the second stages STAGE2 may use a signal output from a second output terminal of a K−1-th one STAGE2[K−1] of the second stages STAGE2 as a second input signal. The signal output from the second output terminal of the K−1-th one STAGE2[K−1] of the second stages STAGE2 may be the second carry signal CARRY2 of the K-th one STAGE2[K] of the second stages STAGE2. For example, a second one STAGE2[2] of the second stages STAGE2 may use a signal output from the second output terminal OUT2[1] of the second one STAGE2[1] of the second stages STAGE2 as a second input signal.

For example, as shown in FIG. 5, an odd first stage (e.g., STAGE1[1], STAGE1[3], etc.) may include an eighth transistor T8 including a control electrode receiving the first clock signal CLK1, a first electrode receiving the first input signal, and a second electrode connected to a fifth node N5, a third capacitor C3 including a first electrode connected to the fifth node N5 and a second electrode connected to the first output terminal OUT1 of the first stage STAGE1, a ninth transistor T9 including a control electrode connected to the sixth node N6, a first electrode receiving a high voltage VGH, and a second electrode connected to a first electrode of the tenth transistor T10, the tenth transistor T10 including a control electrode receiving the second clock signal CLK2, the first electrode connected to the second electrode of the ninth transistor T9, and a second electrode connected to the fifth node N5, a fourth capacitor C4 including a first electrode receiving the high voltage VGH and a second electrode connected to the sixth node N6, an eleventh transistor T11 including a control electrode connected to the fifth node N5, a first electrode receiving the first clock signal CLK1, and a second electrode connected to the sixth node N6, a twelfth transistor T12 including a control electrode receiving the first clock signal CLK1, a first electrode receiving a low voltage VGL, and a second electrode connected to the sixth node N6, a thirteenth transistor T13 including a control electrode connected to the sixth node N6, a first electrode receiving the high voltage VGH, and a second electrode connected to the first output terminal OUT1, and a fourteenth transistor T14 including a control electrode connected to the fifth node N5, a first electrode receiving the second clock signal CLK2, and a second electrode connected to the first output terminal OUT1. Compared to the odd first stage (e.g., STAGE1[1], STAGE1[3], etc.), the even first stage (e.g., STAGE1[2], etc.) may receive the second clock signal CLK2 instead of the first clock signal CLK1, and may receive the first clock signal CLK1 instead of the second clock signal CLK2. Here, the first input signal may be the first scan start signal FLM1 or the first carry signal CARRY1.

For example, as shown in FIG. 6, an odd second stage (e.g., STAGE2[1], STAGE2[3], etc.) may include a fifteenth transistor T15 including a control electrode receiving the third clock signal CLK3, a first electrode receiving a second input signal, and a second electrode connected to a seventh node N7, a fifth capacitor C5 including a first electrode connected to the seventh node N7 and a second electrode connected to a second output terminal OUT2 of the second stage STAGE2, a sixteenth transistor T16 including a control electrode connected to an eighth node N8, a first electrode receiving the high voltage VGH, and a second electrode connected to a first electrode of a seventeenth transistor T17, the seventeenth transistor T17 including a control electrode receiving the fourth clock signal CLK4, the first electrode connected to the second electrode of the sixteenth transistor T16, and a second electrode connected to the seventh node N7, a sixth capacitor C6 including a first electrode receiving the high voltage VGH and a second electrode connected to the eighth node N8, an eighteenth transistor T18 including a control electrode connected to the seventh node N7, a first electrode receiving the third clock signal CLK3, and a second electrode connected to the eighth node N8, a nineteenth transistor T19 including a control electrode receiving the third clock signal CLK3, a first electrode receiving the low voltage VGL, and a second electrode connected to the eighth node N8, a twentieth transistor T20 including a control electrode connected to the eighth node N8, a first electrode receiving the high voltage VGH, and a second electrode connected to the second output terminal OUT2, and a twenty-first transistor T21 including a control electrode connected to the seventh node N7, a first electrode receiving the fourth clock signal CLK4, and a second electrode connected to the second output terminal OUT2. Compared to the odd second stage (e.g., STAGE2[1], STAGE2[3], etc.), the even second stage (e.g., STAGE2[2], etc.) may receive the fourth clock signal CLK4 instead of the third clock signal CLK3, and may receive the third clock signal CLK3 instead of the fourth clock signal CLK4. Here, the second input signal may be the second scan start signal FLM2 or the second carry signal CARRY2.

The first stage STAGE1 and the second stage STAGE2 may be alternately disposed. A phase difference between the first scan start signal FLM1 and the second scan start signal FLM2 may be 1 horizontal time 1H. A phase difference between the first clock signal CLK1 and the third clock signal CLK3 may be 1 horizontal time 1H, and a phase difference between the second clock signal CLK2 and the fourth clock signal CLK4 may be 1 horizontal time 1H. A phase of the first clock signal CLK1 may be opposite to a phase of the second clock signal CLK2, and a phase of the third clock signal CLK3 may be opposite to a phase of the fourth clock signal CLK4. Accordingly, the write gate signals GW[N] for driving one pixel row may be sequentially applied to the display panel 100 of the display device 1000 for 1 horizontal time 1H in one frame. For example, one horizontal time 1H after the signal of the first output terminal OUT1[1] of the first one STAGE1[1] of the first stages STAGE1 decrease from the high voltage level to the low voltage level, the signal of the second output terminal OUT2[1] of the first one STAGE2[1] of the second stages STAGE2 may decrease from the high voltage level to the low voltage level.

For example, as shown in FIGS. 3 and 8, it is assumed that the K-th one STAGE1[K] of the first stages STAGE1 applies the write gate signal GW[L] to the pixel circuit P of a L-th pixel row, where L is a positive integer greater than or equal to 3. The compensation gate signal GC[L−1] applied to the pixel circuit P of a L−1-th pixel row may be generated by inverting the write gate signal GW[L] applied to the pixel circuit P of the L-th pixel row. The initialization gate signal GI[L+2] applied to the pixel circuit P of a L+2-th pixel row may be generated by inverting the write gate signal GW[L] applied to the pixel circuit P of the L-th pixel row. The bias gate signal GB [L−3] applied to the pixel circuit P of a L−3 th pixel row may be the write gate signal GW[L] applied to the pixel circuit P of the L-th pixel row.

For example, as shown in FIGS. 3 and 9, it is assumed that the K-th one STAGE1[K] of the first stages STAGE1 applies the write gate signal GW[L] to the pixel circuit P of the L-th pixel row. The compensation gate signal GC[L] applied to the pixel circuit P of the L-th pixel row may be generated by inverting the write gate signal GW[L+1] generated by the K-th one STAGE2[K] of the second stages STAGE2 (i.e., the write gate signal GW[L+1] applied to the pixel circuit P of a L+1-th pixel row). The initialization gate signal GI[L] applied to the pixel circuit P of the L-th pixel row may be generated by inverting the write gate signal GW[L−2] generated by the K−1-th one STAGE1[K−1] of the first stages STAGE1 (i.e., the write gate signal GW[L−2] applied to the pixel circuit P of a L−2-th pixel row). The bias gate signal GB [L] applied to the pixel circuit P of the L-th pixel row may be the write gate signal GW[L+3] generated by the K+1-th one STAGE2[K+1] of the second stages STAGE2 (i.e., the write gate signal GW[L+3] applied to the pixel circuit P of a L+3-th pixel row).

Figure 10:
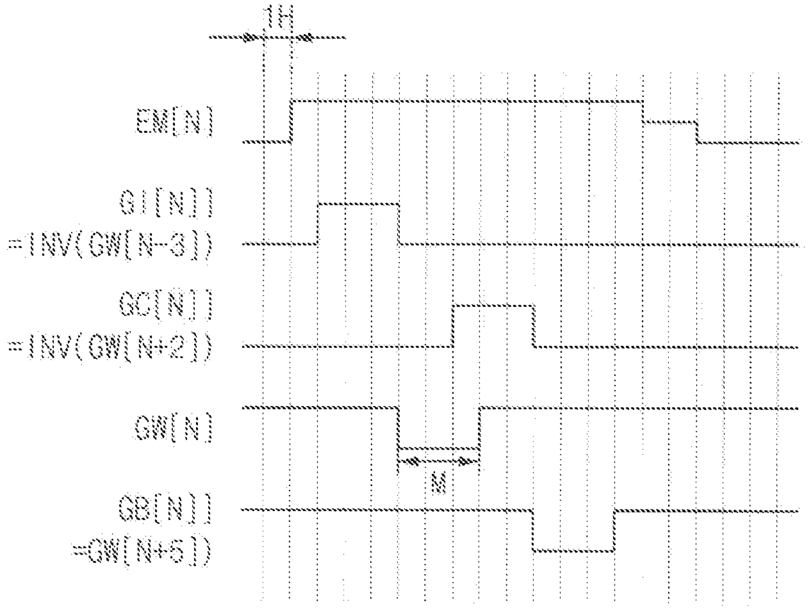
FIG. 10 is a schematic timing diagram illustrating an example of gate signals and emission signals of the display device of FIG. 1.
Figure 11:
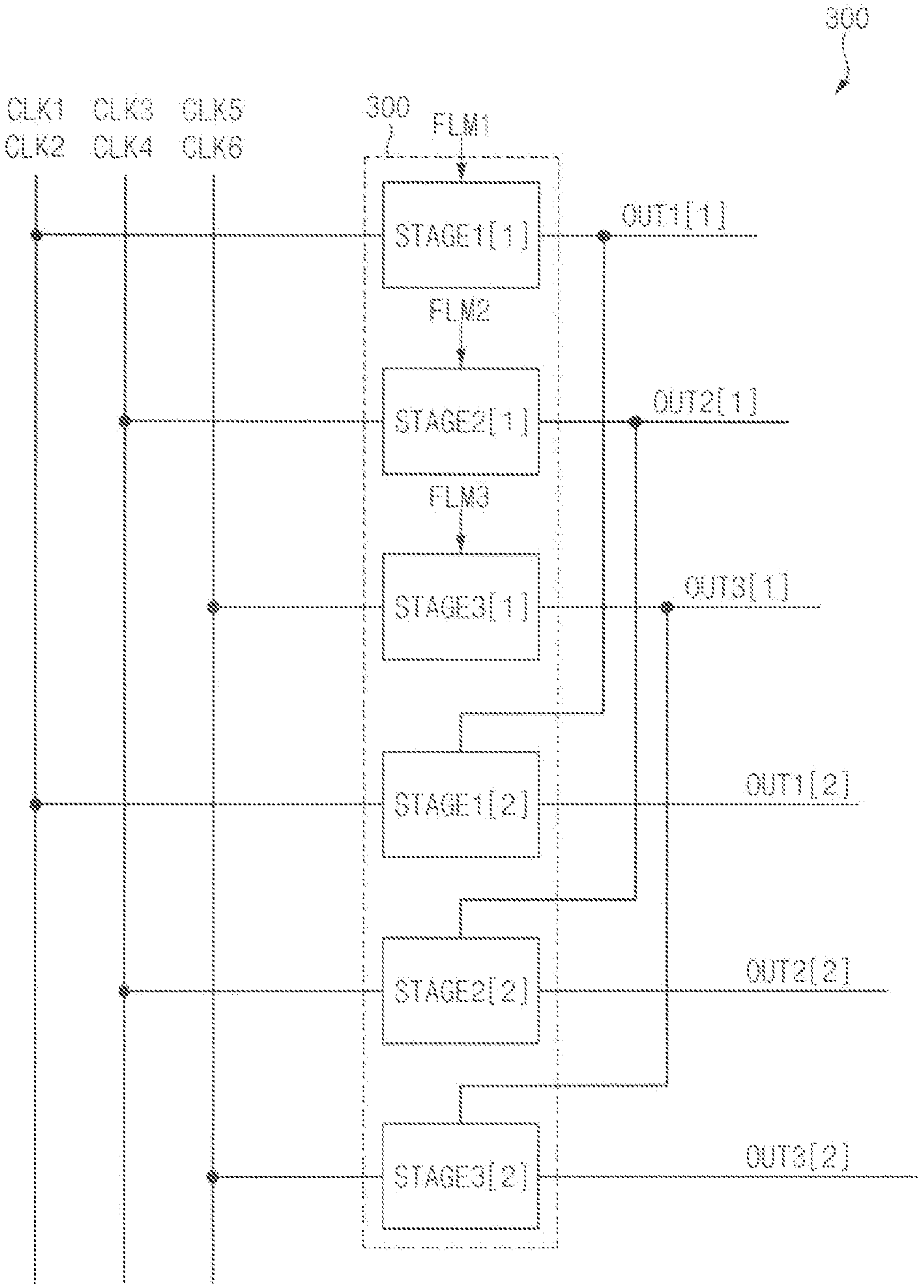
FIG. 11 is a schematic block diagram illustrating an example of stages of the display device of FIG. 1.
Figure 12:
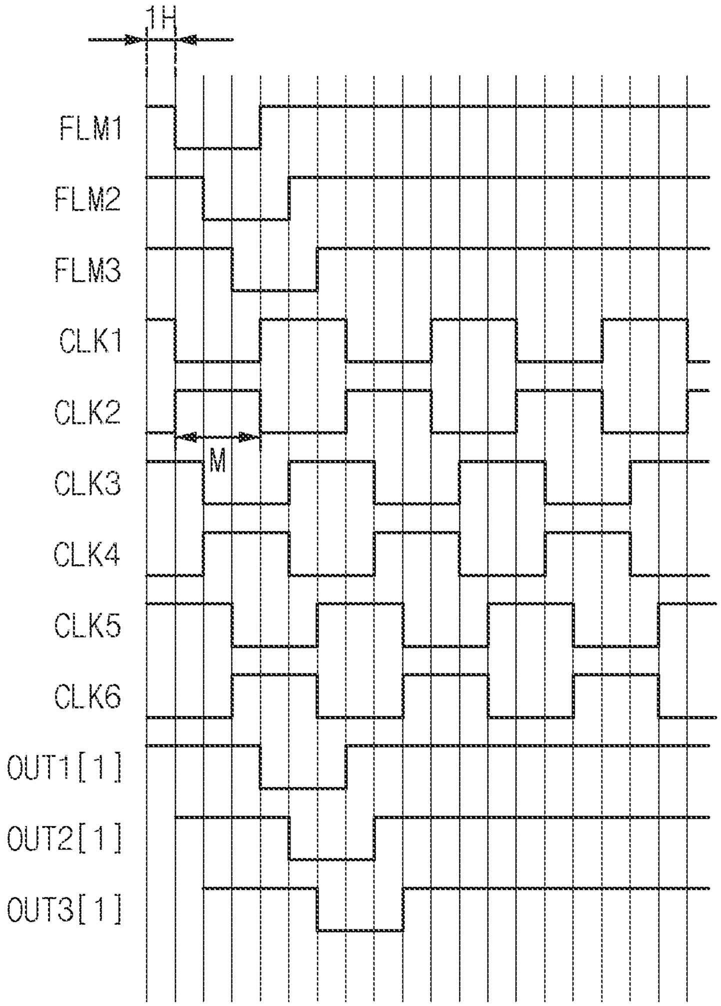
FIG. 12 is a schematic timing diagram illustrating an example of input/output signals of stages of the display device of FIG. 1.

FIG. 10 is a schematic timing diagram illustrating an example of gate signals and emission signals EM[N] of the display device 1000 of FIG. 1, FIG. 11 is a schematic block diagram illustrating an example of stages of the display device 1000 of FIG. 1, and FIG. 12 is a schematic timing diagram illustrating an example of input/output signals of stages of the display device 1000 of FIG. 1. FIGS. 10 to 12 illustrate a case where M is 3.

FIGS. 10 to 12 are substantially the same as the FIGS. 2 to 9 except that M is 3. Thus, the same reference numerals are used to refer to the same or similar element, and any repetitive explanation will be omitted.

Referring to FIGS. 1 and 10, the first next write gate signal GW[N+2] may be a write gate signal applied to a pixel row (i.e., the pixel circuits P included in the pixel row) to which gate signals are applied later than a pixel row to which the current write gate signal (i.e., GW[N]) is applied. For example, in case that the gate driver 300 applies gate signals unidirectionally from top to bottom and applies the write gate signal GW[N] to the third pixel row (i.e., in case N is 3), the first next write gate signal GW[N+2] may be a write gate signal applied to a fifth pixel row. Here, as shown in FIG. 10, the first next write gate signal is represented as GW[N+2], but the disclosure is not limited thereto. For example, the first next write gate signal may be GW[N+1], GW[N+3], GW[N+4], etc.

The previous write gate signal GW[N−3] may be a write gate signal applied to a pixel row to which gate signals are applied earlier than a pixel row to which the current write gate signal (i.e., GW[N]) is applied. For example, in case that the gate driver 300 applies gate signals unidirectionally from top to bottom and applies the write gate signal GW[N] to the fourth pixel row (i.e., in case N is 4), the previous write gate signal GW[N−3] may be a write gate signal applied to the first pixel row. Here, as shown in FIG. 10, the previous write gate signal is represented as GW[N−3], but the disclosure is not limited thereto. For example, the previous write gate signal may be GW[N−1], GW[N−2], GW[N−4], etc.

The second next write gate signal GW[N+5] may be a write gate signal applied to a pixel row to which gate signals are applied later than a pixel row to which the first next write gate signal GW[N+2] is applied. For example, in case that the gate driver 300 applies gate signals unidirectionally from top to bottom and applies the first next write gate signal GW[N+2] to the fifth pixel row (i.e., in case N is 3), the second next write gate signal GW[N+5] may be a write gate signal applied to an eighth pixel row. Here, as shown in FIG. 10, the second next write gate signal is represented as GW[N+5], but the disclosure is not limited thereto. For example, the second next write gate signal may be GW[N+3], GW[N+4], GW[N+6], etc.

Referring to FIGS. 1, and 10 to 12, the gate driver 300 may include a first stage STAGE1, a second stage STAGE2, and a third stage STAGE3. The first stage STAGE1 may generate a write gate signal GW[N] in response to a first clock signal CLK1 having a duration of 3 horizontal time and a second clock signal CLK2 having a duration of 3 horizontal time, the second stage STAGE2 may generate a write gate signal GW[N] in response to a third clock signal CLK3 having a duration of 3 horizontal time and a fourth clock signal CLK4 having a duration of 3 horizontal time, and the third stage may generate a write gate signal GW[N] in response to a fifth clock signal CLK5 having a duration of 3 horizontal time and a sixth clock signal CLK6 having a duration of 3 horizontal time.

The first stage STAGE1 may generate a write gate signal GW[N] in response to the first scan start signal FLM1. For example, a first one STAGE1[1] of the first stages STAGE1 may use the first scan start signal FLM1 as a first input signal. A K-th, where K is a positive integer greater than or equal to 2, one STAGE1[K] of the first stages STAGE1 may use a signal output from a first output terminal of a K−1-th one STAGE1[K−1] of the first stages STAGE1 as a first input signal. The signal output from the first output terminal of the K−1-th one STAGE1[K−1] of the first stages STAGE1 may be the first carry signal CARRY1 of the K-th one STAGE1 [K] of the first stages STAGE1. For example, a second one STAGE1[2] of the first stages STAGE1 may use a signal output from the first output terminal OUT1[1] of the first one STAGE1[1] of the first stages STAGE1 as a first input signal.

The second stage STAGE2 may generate a write gate signal GW[N] in response to the second scan start signal FLM2. For example, a first one STAGE2[1] of the second stages STAGE2 may use the second scan start signal FLM2 as a second input signal. A K-th one STAGE2[K] of the second stages STAGE2 may use a signal output from a second output terminal of a K−1-th one STAGE2[K−1] of the second stages STAGE2 as a second input signal. The signal output from the second output terminal of the K−1-th one STAGE2[K−1] of the second stages STAGE2 may be the second carry signal CARRY2 of the K-th one STAGE2 [K] of the second stages STAGE2. For example, a second one STAGE2[2] of the second stages STAGE2 may use a signal output from the second output terminal OUT2[1] of the first one STAGE2[1] of the second stages STAGE2 as a second input signal.

The third stage STAGE3 may generate a write gate signal GW[N] in response to the third scan start signal FLM3. For example, a first one STAGE3[1] of the third stages STAGE3 may use the third scan start signal FLM3 as a third input signal. A K-th one STAGE3[K] of the third stages STAGE3 may use a signal output from a third output terminal of a K−1-th one STAGE3[K−1] of the third stages STAGE3 as a third input signal. The signal output from the third output terminal of the K−1-th one STAGE3[K−1] of the third stages STAGE3 may be the third carry signal CARRY3 of the K-th one STAGE3[K] of the third stages STAGE3. For example, a second one STAGE3[2] of the third stages STAGE3 may use a signal output from the third output terminal OUT3[1] of the first one STAGE3[1] of the third stages STAGE3 as a third input signal.

The first stage STAGE1, the second stage STAGE2, and the third stage STAGE3 may be alternately disposed. A phase difference between the first scan start signal FLM1 and the second scan start signal FLM2 may be 1 horizontal time 1H, and a phase difference between the second scan start signal FLM2 and the third scan start signal FLM3 may be 1 horizontal time 1H. A phase difference between the first clock signal CLK1 and the third clock signal CLK3 may be 1 horizontal time 1H, a phase difference between the third clock signal CLK3 and the fifth clock signal CLK5 may be 1 horizontal time 1H, a phase difference between the second clock signal CLK2 and the fourth clock signal CLK4 may be 1 horizontal time 1H, and a phase difference between the fourth clock signal CLK4 and the sixth clock signal CLK6 may be 1 horizontal time 1H. A phase of the second clock signal CLK2 may be opposite to a phase of the first clock signal CLK1, a phase of the third clock signal CLK3 may be opposite to a phase of the fourth clock signal CLK4, and a phase of the fifth clock signal CLK5 may be opposite to a phase of the sixth clock signal CLK6. Accordingly, the write gate signals GW[N] for driving one pixel row may be sequentially applied to the display panel 100 of the display device 1000 for 1 horizontal time 1H in one frame. For example, one horizontal time 1H after the signal of the first output terminal OUT1[1] of the first one STAGE1[1] of the first stages STAGE1 decrease from the high voltage level to the low voltage level, the signal of the second output terminal OUT2[1] of the first one STAGE2[1] of the second stages STAGE2 may decrease from the high voltage level to the low voltage level. For example, one horizontal time 1H after the signal of the second output terminal OUT2[1] of the first one STAGE2[1] of the second stages STAGE2 decrease from the high voltage level to the low voltage level, the signal of the third output terminal OUT3[1] of the first one STAGE3[1] of the third stages STAGE3 may decrease from the high voltage level to the low voltage level.

FIGS. 2 to 12 illustrate a case in which M is 2 or 3, but the disclosure is not limited thereto. For example, M may be 4 or more. Accordingly, more clock signals may be used.

Figure 13:
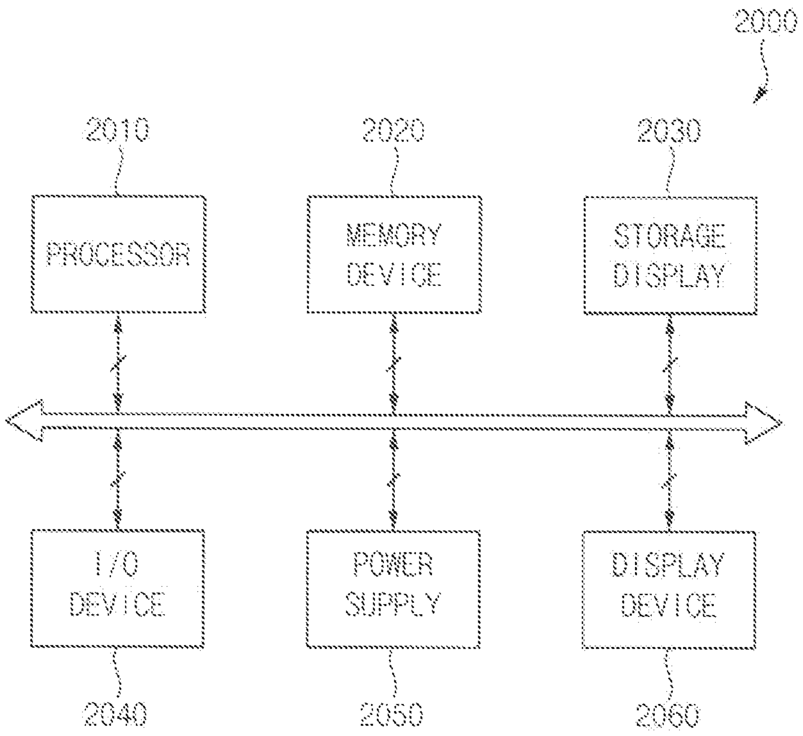
FIG. 13 is a schematic block diagram showing an electronic device according to embodiments of the disclosure.
Figure 14:
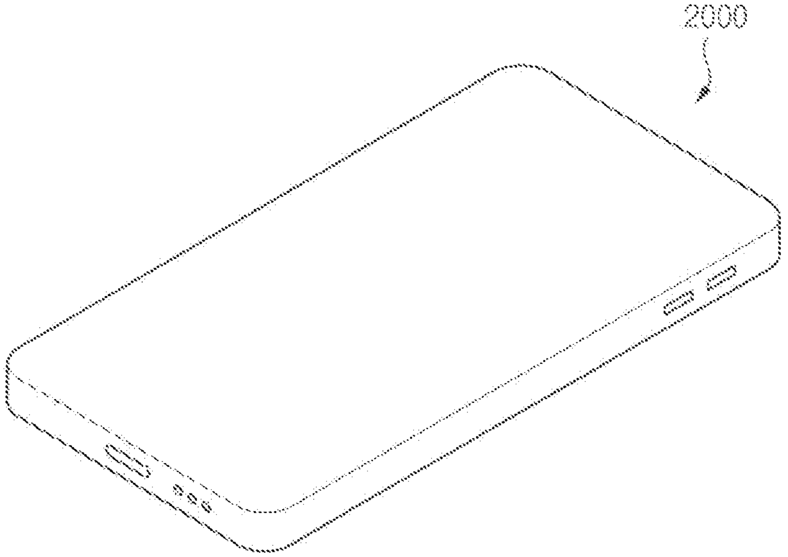
FIG. 14 is a perspective view in which the electronic device of FIG. 13 is implemented as a smart phone.

FIG. 13 is a schematic block diagram showing an electronic device according to embodiments of the disclosure, and FIG. 14 is a perspective view in which the electronic device of FIG. 11 is implemented as a smart phone.

Referring to FIGS. 13 and 14, the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. The electronic device 2000 may further include multiple ports for communicating with a video card, a sound card, a memory card, a universal serial bus (USB) device, other electronic devices, etc. In an embodiment, as shown in FIG. 14, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a micro processor, a central processing unit (CPU), an application processor (AP), etc. The processor 2010 may be connected to other components via an address bus, a control bus, a data bus, etc. Further, the processor 2010 may be connected to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be connected to other components via buses or other communication links. The display device 2060 may reduce power consumption and save a space for additional drivers for generating respective gate signals. Also, the display device 2060 may increase a threshold voltage compensation time of a driving transistor.

The disclosure may be applied to any electronic device including a display device. For example, the disclosure may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pixel circuit comprising:

a first transistor including a control electrode electrically connected to a first node, a first electrode electrically connected to a second node, and a second electrode electrically connected to a third node;

a second transistor including a control electrode that receives a write gate signal generated based on clock signals having a duration of M horizontal time, M being a positive integer greater than or equal to 2, a first electrode that receives a data voltage, and a second electrode electrically connected to the second node;

a third transistor including a control electrode that receives a compensation gate signal generated based on a first next write gate signal applied after the write gate signal is applied, a first electrode electrically connected to the third node, and a second electrode electrically connected to the first node;

a first capacitor including a first electrode that receives a first power voltage and a second electrode electrically connected to the first node;

a fourth transistor including a control electrode that receives an initialization gate signal generated based on a previous write gate signal applied before the write gate signal is applied, a first electrode that receives a first initialization voltage, and a second electrode electrically connected to the first node;

a fifth transistor including a control electrode that receives an emission signal, a first electrode that receives the first power voltage, and a second electrode electrically connected to the second node;

a sixth transistor including a control electrode that receives the emission signal, a first electrode electrically connected to the third node, and a second electrode electrically connected to a fourth node; and a light emitting element including a first electrode electrically connected to the fourth node and a second electrode that receives a second power voltage, wherein the second transistor is a p-type transistor, and the third transistor and the fourth transistor are n-type transistors, and wherein the initialization gate signal is generated by inverting the previous write gate signal, and the compensation gate signal is generated by inverting the first next write gate signal.

2. The pixel circuit of claim 1, further comprising:

a second capacitor including a first electrode that receives the write gate signal and a second electrode electrically connected to the first node; and a seventh transistor including a control electrode that receives a second next write gate signal applied after the first next write gate signal is applied, a first electrode that receives a second initialization voltage, and a second electrode electrically connected to the fourth node.

3. The pixel circuit of claim 2, wherein the seventh transistor is a p-type transistor.

4. The pixel circuit of claim 1, wherein the emission signal decreases stepwise in case that the emission signal decreases from a high voltage level to a low voltage level.

5. A display device comprising:

a display panel including a pixel circuit;

a gate driver that generates a write gate signal based on clock signals having a duration of M horizontal time, M being a positive integer greater than or equal to 2, an initialization gate signal based on a previous write gate signal applied before the write gate signal is applied, and a compensation gate signal based on a first next write gate signal applied after the write gate signal is applied;

a data driver that applies a data voltage to the pixel circuit;

an emission driver that applies an emission signal to the pixel circuit; and a timing controller that controls the gate driver, the data driver, and the emission driver, wherein the pixel circuit includes:

a first transistor including a control electrode electrically connected to a first node, a first electrode electrically connected to a second node, and a second electrode electrically connected to a third node;

a second transistor including a control electrode that receives the write gate signal, a first electrode that receives the data voltage, and a second electrode electrically connected to the second node;

a third transistor including a control electrode that receives the compensation gate signal, a first electrode electrically connected to the third node, and a second electrode electrically connected to the first node;

a first capacitor including a first electrode that receives a first power voltage and a second electrode electrically connected to the first node;

a fourth transistor including a control electrode that receives the initialization gate signal, a first electrode that receives a first initialization voltage, and a second electrode electrically connected to the first node;

a fifth transistor including a control electrode that receives the emission signal, a first electrode that receives the first power voltage, and a second electrode electrically connected to the second node;

a sixth transistor including a control electrode that receives the emission signal, a first electrode electrically connected to the third node, and a second electrode electrically connected to a fourth node; and a light emitting element including a first electrode electrically connected to the fourth node and a second electrode that receives a second power voltage, wherein the second transistor is a p-type transistor, and the third transistor and the fourth transistor are n-type transistors, and wherein the initialization gate signal is generated by inverting the previous write gate signal, and the compensation gate signal is generated by inverting the first next write gate signal.

6. The display device of claim 5, wherein the pixel circuit further includes:

a second capacitor including a first electrode that receives the write gate signal and a second electrode electrically connected to the first node; and a seventh transistor including a control electrode that receives a second next write gate signal applied after the first next write gate signal is applied, a first electrode that receives a second initialization voltage, and a second electrode electrically connected to the fourth node.

7. The display device of claim 6, wherein the seventh transistor is a p-type transistor.

8. The display device of claim 5, wherein the emission signal decreases stepwise in case that the emission signal decreases from a high voltage level to a low voltage level.

9. The display device of claim 5, wherein the gate driver includes a first stage and a second stage, the write gate signal includes a first write gate signal and a second write gate signal, the clock signals include a first clock signal, a second clock signal, a third clock signal, and a fourth clock signal, the first stage generates the first write gate signal based on the first clock signal having a duration of 2 horizontal time and the second clock signal having a duration of 2 horizontal time, and the second stage generates the second write gate signal based on the third clock signal having a duration of 2 horizontal time and the fourth clock signal having a duration of 2 horizontal time.

10. The display device of claim 9, wherein a phase difference between the first clock signal and the third clock signal is 1 horizontal time, and a phase difference between the second clock signal and the fourth clock signal is 1 horizontal time.

11. The display device of claim 10, wherein the first stage generates the first write gate signal in response to a first scan start signal, the second stage generates the second write gate signal in response to a second scan start signal, and a phase difference between the first scan start signal and the second scan start signal is 1 horizontal time.

12. The display device of claim 9, wherein the first stage includes:

an eighth transistor including a control electrode that receives the first clock signal, a first electrode that receives a first input signal, and a second electrode electrically connected to a fifth node;

a third capacitor including a first electrode electrically connected to the fifth node and a second electrode electrically connected to a first output terminal of the first stage;

a ninth transistor including a control electrode electrically connected to a sixth node, a first electrode that receives a high voltage, and a second electrode;

a tenth transistor including a control electrode that receives the second clock signal, a first electrode electrically connected to the second electrode of the ninth transistor, and a second electrode electrically connected to the fifth node;

a fourth capacitor including a first electrode that receives the high voltage and a second electrode electrically connected to the sixth node;

an eleventh transistor including a control electrode electrically connected to the fifth node, a first electrode that receives the first clock signal, and a second electrode electrically connected to the sixth node;

a twelfth transistor including a control electrode that receives the first clock signal, a first electrode that receives a low voltage, and a second electrode electrically connected to the sixth node;

a thirteenth transistor including a control electrode electrically connected to the sixth node, a first electrode that receives the high voltage, and a second electrode electrically connected to the first output terminal; and a fourteenth transistor including a control electrode electrically connected to the fifth node, a first electrode that receives the second clock signal, and a second electrode electrically connected to the first output terminal.

13. The display device of claim 12, wherein the second stage includes:

a fifteenth transistor including a control electrode that receives the third clock signal, a first electrode that receives a second input signal, and a second electrode electrically connected to a seventh node;

a fifth capacitor including a first electrode electrically connected to the seventh node and a second electrode electrically connected to a second output terminal of the second stage;

a sixteenth transistor including a control electrode electrically connected to an eighth node, a first electrode that receives the high voltage, and a second electrode;

a seventeenth transistor including a control electrode that receives the fourth clock signal, a first electrode electrically connected to the second electrode of the sixteenth transistor, and a second electrode electrically connected to the seventh node;

a sixth capacitor including a first electrode that receives the high voltage and a second electrode electrically connected to the eighth node;

an eighteenth transistor including a control electrode electrically connected to the seventh node, a first electrode that receives the third clock signal, and a second electrode electrically connected to the eighth node;

a nineteenth transistor including a control electrode that receives the third clock signal, a first electrode that receives the low voltage, and a second electrode electrically connected to the eighth node;

a twentieth transistor including a control electrode electrically connected to the eighth node, a first electrode that receives the high voltage, and a second electrode electrically connected to the second output terminal; and a twenty-first transistor including a control electrode electrically connected to the seventh node, a first electrode that receives the fourth clock signal, and a second electrode electrically connected to the second output terminal.

14. The display device of claim 5, wherein the gate driver includes a first stage, a second stage, and a third stage, the write gate signal includes a first write gate signal, a second write gate signal, and a third write gate signal, the clock signals include a first clock signal, a second clock signal, a third clock signal, a fourth clock signal, a fifth clock signal, and a sixth clock signal, the first stage generates the first write gate signal in response to the first clock signal having a duration of 3 horizontal time and the second clock signal having a duration of 3 horizontal time, the second stage generates the second write gate signal in response to the third clock signal having a duration of 3 horizontal time and the fourth clock signal having a duration of 3 horizontal time, and the third stage generates the third write gate signal in response to the fifth clock signal having a duration of 3 horizontal time and the sixth clock signal having a duration of 3 horizontal time.

15. The display device of claim 14, wherein a phase difference between the first clock signal and the third clock signal is 1 horizontal time, a phase difference between the third clock signal and the fifth clock signal is 1 horizontal time, a phase difference between the second clock signal and the fourth clock signal is 1 horizontal time, and a phase difference between the fourth clock signal and the sixth clock signal is 1 horizontal time.

16. The display device of claim 15, wherein the first stage generates the first write gate signal in response to a first scan start signal, the second stage generates the second write gate signal in response to a second scan start signal, the third stage generates the third write gate signal in response to a third scan start signal, a phase difference between the first scan start signal and the second scan start signal is 1 horizontal time, and a phase difference between the second scan start signal and the third scan start signal is 1 horizontal time.

* * * * *